US011927338B2

(12) United States Patent
Li et al.

(10) Patent No.: US 11,927,338 B2
(45) Date of Patent: Mar. 12, 2024

(54) LIGHTING APPARATUS

(71) Applicant: LEEDARSON LIGHTING CO., LTD., Fujian (CN)

(72) Inventors: Kunbing Li, Fujian (CN); Chengkun Liu, Fujian (CN)

(73) Assignee: LEEDARSON LIGHTING CO., LTD., Fujian (CN)

(*) Notice: Subject to any disclaimer, the term of this patent is extended or adjusted under 35 U.S.C. 154(b) by 0 days.

(21) Appl. No.: 17/895,797

(22) Filed: Aug. 25, 2022

(65) Prior Publication Data

US 2023/0061178 A1 Mar. 2, 2023

(30) Foreign Application Priority Data

Aug. 25, 2021 (CN) ......................... 202122018290.0
Aug. 25, 2021 (CN) ........................ 202122018302.X

(51) Int. Cl.
*F21V 33/00* (2006.01)
*F21V 21/14* (2006.01)

(52) U.S. Cl.
CPC .......... *F21V 33/0096* (2013.01); *F21V 21/14* (2013.01)

(58) Field of Classification Search
CPC ....... F21V 33/0096; F21V 21/14; F21V 21/22
See application file for complete search history.

(56) References Cited

U.S. PATENT DOCUMENTS

| | | | | |
|---|---|---|---|---|
| 11,454,382 | B1 * | 9/2022 | Wong | F21V 21/108 |
| 2005/0117341 | A1 * | 6/2005 | Craw | F21V 29/67 362/253 |
| 2014/0241001 | A1 * | 8/2014 | Yoshikawa | F21V 29/503 362/547 |
| 2019/0113221 | A1 * | 4/2019 | Huang | F04D 17/16 |
| 2022/0018523 | A1 * | 1/2022 | Vinh | F21V 21/03 |
| 2022/0195781 | A1 * | 6/2022 | Hall | E05F 15/77 |
| 2022/0205616 | A1 * | 6/2022 | Ameloot | F21V 21/22 |
| 2022/0243903 | A1 * | 8/2022 | Chen | F21V 21/30 |

* cited by examiner

*Primary Examiner* — Christopher E Dunay
(74) *Attorney, Agent, or Firm* — Chun-Ming Shih; LANWAY IPR SERVICES

(57) ABSTRACT

A lighting apparatus includes a main housing, a light module, a ventilating fan and a fixing frame. The main housing has a fan bracket and a light bracket. The light module is disposed to the light bracket for emitting a light outwardly to an illuminated space. The ventilating fan is attached to the fan bracket. The ventilating fan has an air passage exposed to the illuminated area for air to flow passing the air passage driven by the ventilating fan. The fixing frame holds the main housing and is used for fixing to one of multiple types of installation platforms. The main housing is detachable from the fixing frame. The fixing frame has two telescopic levers arranged in parallel for changing a spanning diameter to fit different installation platforms. The main housing is attached on the fixing bracket.

19 Claims, 8 Drawing Sheets

LIGHTING APPARATUS

FIELD

The present invention is related to a lighting apparatus, and more particularly related to a lighting apparatus with a ventilating fan.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

People need to install light devices in bath rooms or similar places. Meanwhile, people also like to install ventilating fans to cause air flow removing humidity or bad smell. It is therefore beneficial to combine the two devices.

In addition, it is more helpful if the integration of modules is easier to be installed in various installation platforms.

SUMMARY

In some embodiments, a lighting apparatus includes a main housing, a light module, a ventilating fan and a fixing frame.

The main housing has a fan bracket and a light bracket.

The light module is disposed to the light bracket for emitting a light outwardly to an illuminated space.

The ventilating fan is attached to the fan bracket.

The ventilating fan has an air passage exposed to the illuminated area for air to flow passing the air passage driven by the ventilating fan.

The fixing frame holds the main housing and is used for fixing to one of multiple types of installation platforms. For example, a ceiling with or without adjacent beams may be different installation platforms.

The main housing is detachable from the fixing frame.

The fixing frame has two telescopic levers arranged in parallel for changing a spanning diameter to fit different installation platforms.

The main housing is attached on the fixing bracket.

In some embodiments, fixing frame has a pair of gear tracks and a pair of gear blocks.

A bottom of the gear block engages the installation platform.

The gear block is movable along the gear track to adjust a relative position of the fixing frame to the installation platform.

In some embodiments, the gear block has an elastic unit for elastically engaging the installation platform.

In some embodiments, the elastic unit is a U-shape clip with a bottom side pressing the installation platform.

In some embodiments, the elastic unit is made of metal material for transmitting heat of the main housing to the installation platform.

In some embodiments, multiple protruding clips extends from edges of the fixing frame to press to a bottom side of a plate of the installation platform while the bottom of the gear block engages a top side of the plate of the installation platform so as to firmly fix the fixing frame to the plate of the installation platform.

In some embodiments, the gear track includes a fork structure defining a track passage for inserting the gear block.

The fork structure has multiple gear units for keeping the gear block unless an external force is applied to the gear block to move with respect to the gear track.

In some embodiments, when the gear block moves along the gear track, the fork structure has an elastic deformation when the external force is applied to the gear block.

In some embodiments, the fixing frame has two bars arranged in parallel for disposing the gear tracks.

The two bars and the telescopic levers form a rectangular structure.

In some embodiments, the gear track has a limiter for limiting a movement range of the gear block with respect to the gear track.

In some embodiments, the fixing frame has two grooves for inserting protruding tongues into the two grooves to attach the main housing to the fixing frame.

In some embodiments, the main housing is movable along the two groove.

In some embodiments, the installation platform includes two beams and a top ceiling.

Two ends of the fixing frame are respectively fixed to the two beams.

In some embodiments, the two telescopic levers are adjusted to change a spanning length to fit a distance between the two beams.

In some embodiments, a ceiling plate has an installation opening for fixing the fixing frame.

The ceiling plate is attached to the ceiling after the fixing frame and the main housing are fixed to the ceiling plate.

In some embodiments, a lateral side of the fixing frame has installation holes to be fixed to a lateral side of a beam.

The main housing is installed to the fixing frame after the fixing frame is fixed to the beam.

In some embodiments, an ultraviolet light source is placed in air tunnel for the air driven by the ventilating fan to sterilize the air.

In some embodiments, the ventilating fan has a humidity sensor and automatically turns on the ventilating fan when the humidity sensor detects a humidity larger than a predetermined threshold.

In some embodiments, the ventilating fan creates an air flow to perform heat dissipation of the light module.

In some embodiments, the light module emits a light signal when the ventilating fan functions abnormally.

DETAILED DESCRIPTION

In some embodiments, a lighting apparatus includes a main housing, a light module, a ventilating fan and a fixing frame.

Figure 6:
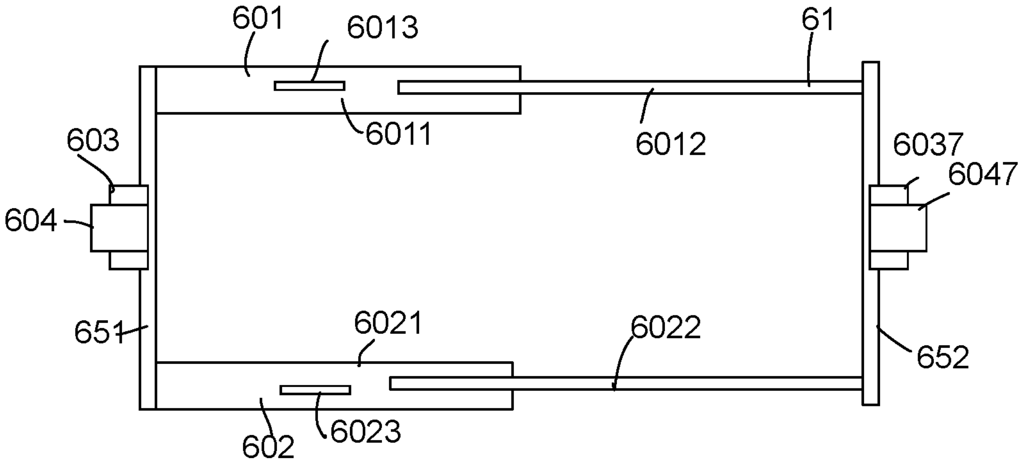
FIG. 6 illustrates another lighting apparatus embodiment.

Please refer to FIG. 6, which shows an example of a fixing frame 61. The fixing frame 61 has two telescopic levers 601, 602. Similarly, the telescopic lever 602 has a first part 6021 and a second part 6022. The telescopic lever 601 has a first part 6011 and a second part which may be moved to change a total length of the telescopic lever 601. There are various ways to implement such telescopic lever, e.g. using two tubes to move with each other, or a first part of a telescopic lever moving along a sliding track disposed on a second part of the telescopic lever.

Figure 7:
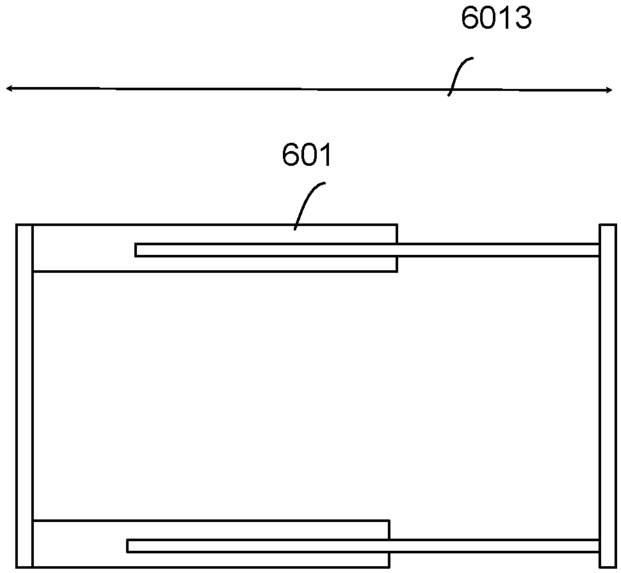
FIG. 7 shows a dimension change by adjusting the telescopic levers.

FIG. 7 shows a dimension change by moving the first part with respect to the second part of the telescopic lever 601. It is clearly to compare FIG. 6 and FIG. 7 to see a total length 6013 of the fixing frame is changed.

The main housing has a fan bracket and a light bracket.

Figure 8:
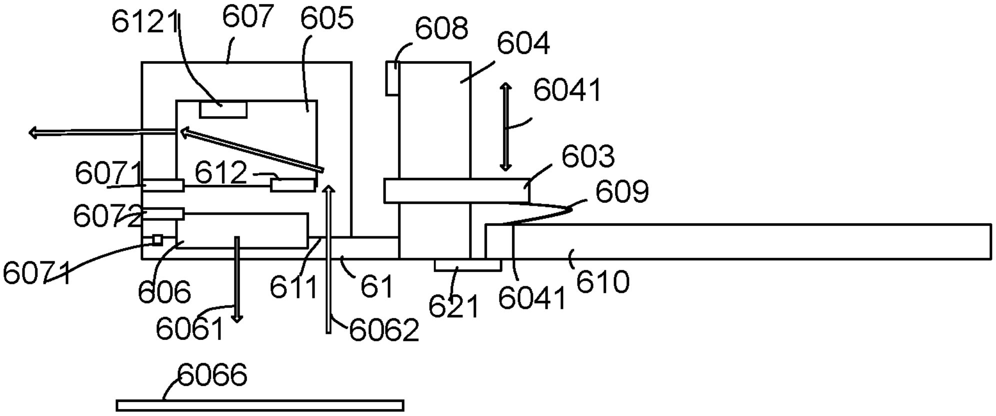
FIG. 8 shows a side view illustrating how a fixing frame is fixed to an installation platform.

Please refer to FIG. 8. FIG. 8 shows a main housing 607 has a fan bracket 6071 and a light bracket 6072.

The light module 6061 is disposed to the light bracket 6072 for emitting a light 6061 outwardly to an illuminated space 6066.

The ventilating fan 605 is attached to the fan bracket 6071.

The ventilating fan 605 has an air passage 6062 partly exposed to the illuminated area 6066 for air to flow passing the air passage 6062 driven by the ventilating fan 605.

The fixing frame 61 holds the main housing 607 and is used for fixing to one of multiple types of installation platforms. For example, a ceiling with or without adjacent beams may be different installation platforms.

In the example of FIG. 8, a ceiling plate 610 is the installation platform.

The main housing 607 may be detachable from the fixing frame 61. In such design, the fixing frame may be installed first. In addition, the different main housing may be selected to meet different requirements.

Please refer back to FIG. 6.

The fixing frame 61 has two telescopic levers 601, 602 arranged in parallel for changing a spanning diameter to fit different installation platforms. FIG. 7 shows an example of the spanning diameter 6013.

The main housing is attached on the fixing bracket, which is explained and illustrated in FIG. 8 as described above.

In FIG. 6, the fixing frame has a pair of gear tracks 6037, 603 and a pair of gear blocks 6047, 604.

FIG. 8 shows another view of the example in FIG. 6. In FIG. 8, a bottom 6041 of the gear block 603 engages the installation platform, e.g. the ceiling plate 610.

The gear block 603 is movable along the gear track 604 to adjust a relative position 6041 of the fixing frame 61 to the installation platform, e.g. the ceiling plate 610.

In some embodiments, the gear block 603 has an elastic unit 609 for elastically engaging the installation platform.

In some embodiments, the elastic unit 609 is a U-shape clip with a bottom side pressing the installation platform, as shown in FIG. 8.

In some embodiments, the elastic unit is made of metal material for transmitting heat of the main housing to the installation platform.

In FIG. 8, multiple protruding clips 621 extend from edges of the fixing frame 61 to press to a bottom side of the ceiling plate 610 of the installation platform while the bottom of the gear block 603 engages a top side of the ceiling plate 610 of the installation platform so as to firmly fix the fixing frame 61 to the ceiling plate 610 of the installation platform.

In some embodiments, the gear track includes a fork structure defining a track passage for inserting the gear block.

Figure 3:
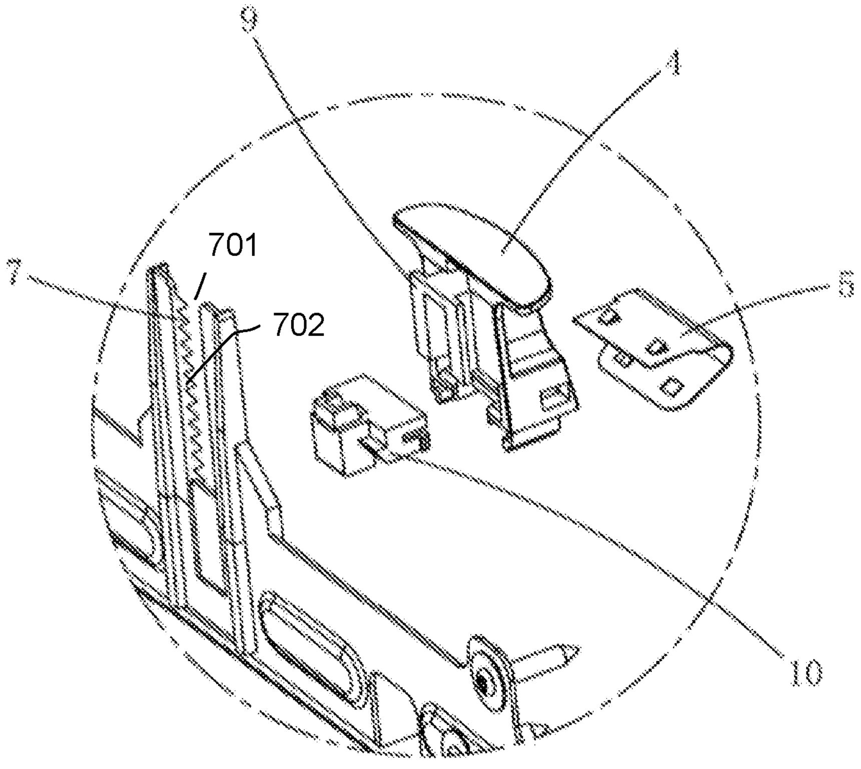
FIG. 3 illustrates a zoom-up view of an explosion diagram of connecting components.

FIG. 3 shows an example of a gear track 7 defining a track passage 701 for inserting the gear block 4.

In FIG. 3, the gear block has a gear unit 10 with corresponding gears corresponding to the gears in the gear track 7.

There is also a U-shape elastic unit 5 disposed at a bottom of the gear block 4 to perform the function mentioned above. A protruding I-shape structure is provided on the gear block 4 for the gear block 4 to move along the track passage 701 of the gear track 7.

The fork structure has multiple gear units 702 for keeping the gear block 4 unless an external force is applied to the gear block 604 to move with respect to the gear track 7.

In some embodiments, when the gear block moves along the gear track, the fork structure has an elastic deformation when the external force is applied to the gear block.

In FIG. 6, the fixing frame has two bars 651, 652 arranged in parallel for disposing the gear tracks 603, 6037.

The two bars 651, 652 and the telescopic levers 601, 602 form a rectangular structure.

In FIG. 8, the gear track has a limiter 608 for limiting a movement range of the gear block 603 with respect to the gear track 604.

In some embodiments, the fixing frame has two grooves 6013, 6023 for inserting protruding tongues into the two grooves to attach the main housing to the fixing frame.

FIG. 8 shows an example of protruding tongue 6071 to be inserted to the groove of the fixing frame 61.

In some embodiments, the main housing is movable along the two groove.

Figure 9:
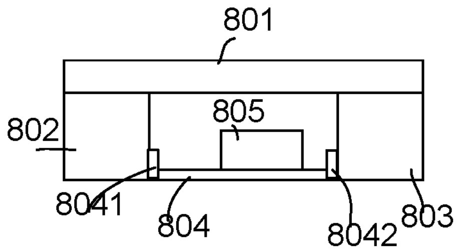
FIG. 9 shows an installation example.

In FIG. 9, the installation platform includes two beams 802, 803 and a top ceiling 801.

Two ends 8041, 8042 of the fixing frame 804 are respectively fixed to the two beams 802, 803.

In some embodiments, the two telescopic levers are adjusted to change a spanning length to fit a distance between the two beams 802, 803, as illustrated in FIG. 6 and FIG. 7 mentioned above. In FIG. 8, the fixing frame 804 supports a main housing 805 that carries a light module and a ventilating fan.

Figure 10:
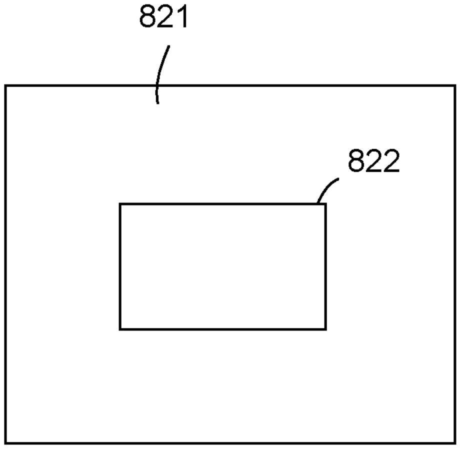
FIG. 10 shows another installation example.

In FIG. 10, a ceiling plate 821 has an installation opening 822 for fixing the fixing frame.

The ceiling plate 821 is attached to the ceiling after the fixing frame and the main housing are fixed to the ceiling plate 821.

In some embodiments, a lateral side of the fixing frame has installation holes to be fixed to a lateral side of a beam. This may be understood by removing the beam 803 in FIG. 9, which means only one side of the fixing frame is fixed to a beam 802.

The main housing is installed to the fixing frame after the fixing frame is fixed to the beam.

In FIG. 8, an ultraviolet light source 612 is placed in air tunnel for the air driven by the ventilating fan 605 to sterilize the air.

In some embodiments, the ventilating fan has a humidity sensor 6121 and automatically turns on the ventilating fan 605 when the humidity sensor 6121 detects a humidity larger than a predetermined threshold.

In some embodiments, the ventilating fan 605 creates an air flow to perform heat dissipation of the light module 606.

In some embodiments, the light module 606 emits a light signal when the ventilating fan 605 functions abnormally, e.g. a blinking light pattern.

Figure 1:
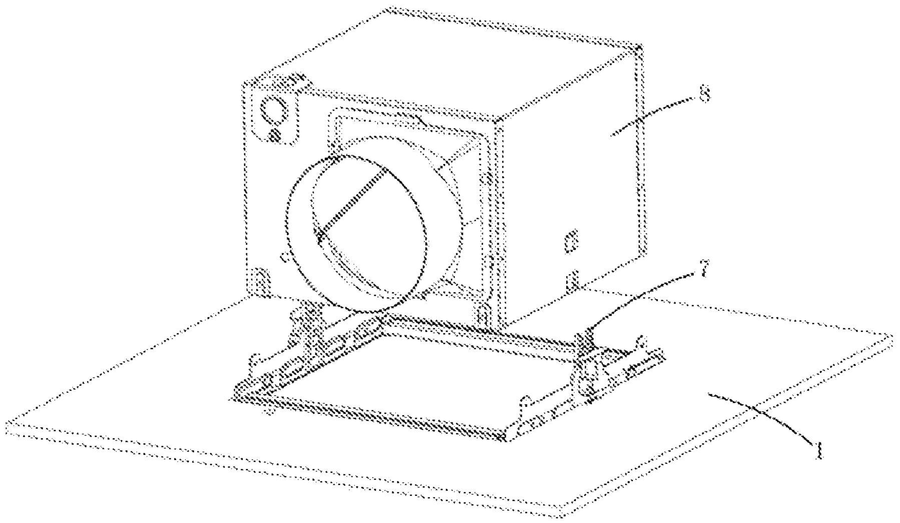
FIG. 1 illustrates a lighting apparatus embodiment with a fixing frame.

FIG. 1 shows an example of a main housing 8 carrying a ventilating fan and a light module to be attached to a fixing frame 7 that is fixed on a ceiling plate 1 in advance.

Figure 2:
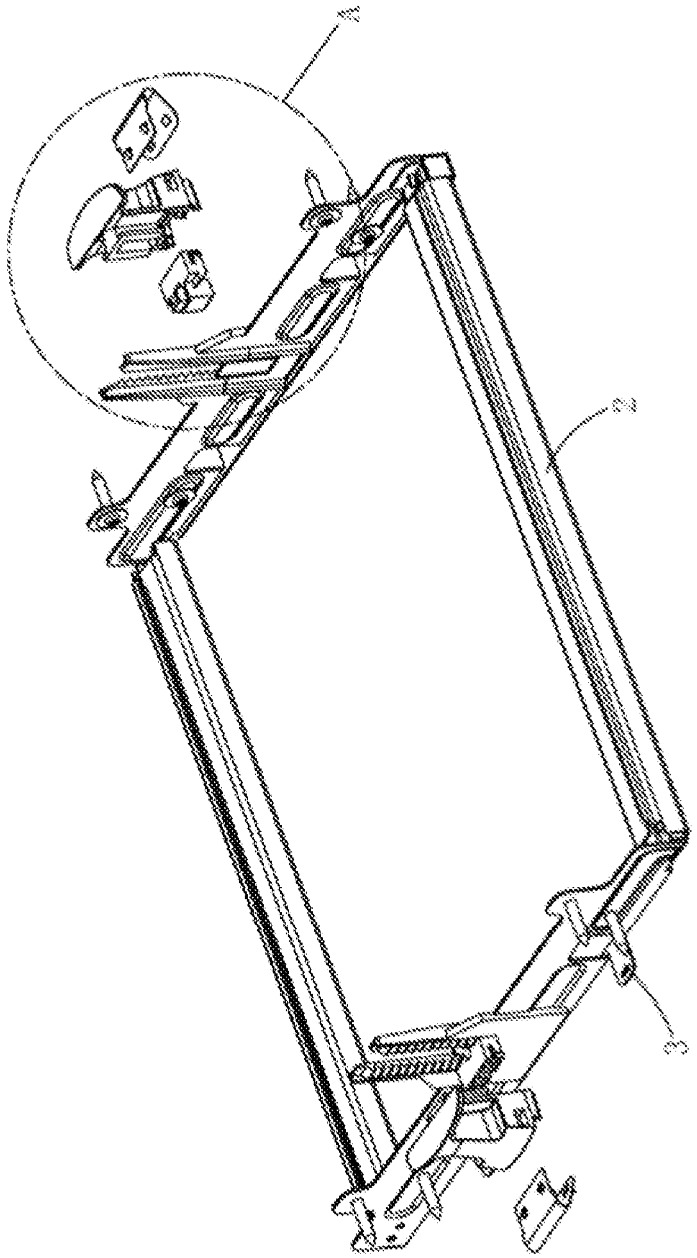
FIG. 2 illustrates an example of a fixing frame.

FIG. 2 shows a fixing frame example. In FIG. 2, the fixing frame has a telescopic lever 2 as explained above.

There are protruding clips 3 disposed on the fixing frame to fix to an installation plate like the ceiling plate 1 illustrated in FIG. 1.

FIG. 3 shows a zoom-up view of the area A of FIG. 2. FIG. 3 is already explained in previous description.

Figure 4:
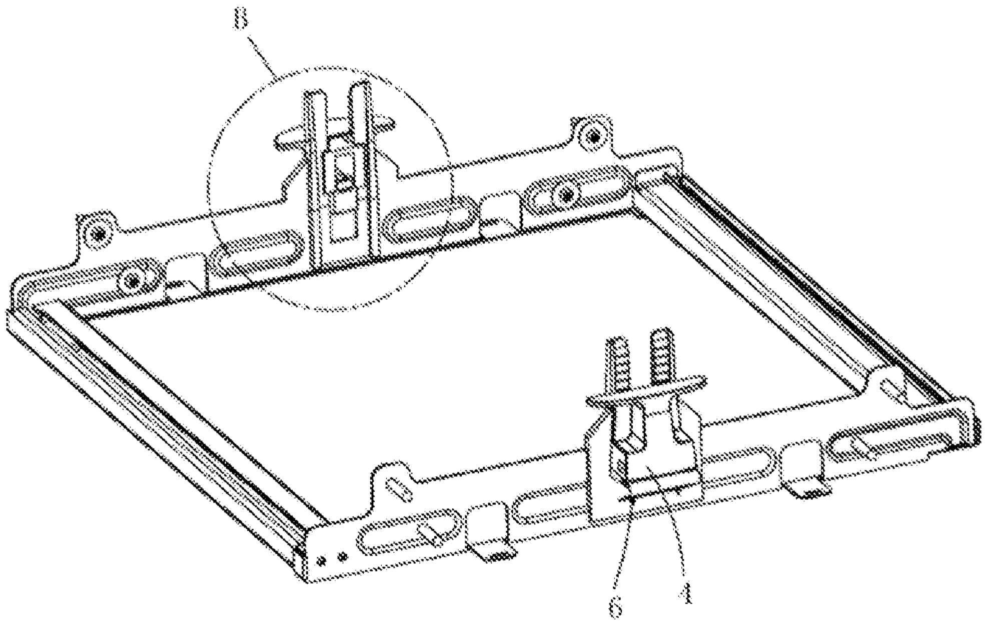
FIG. 4 illustrates an example showing gear tracks and gear blocks.

FIG. 4 shows a gear block 4 with its bottom 6 to engage an installation platform.

Figure 5:
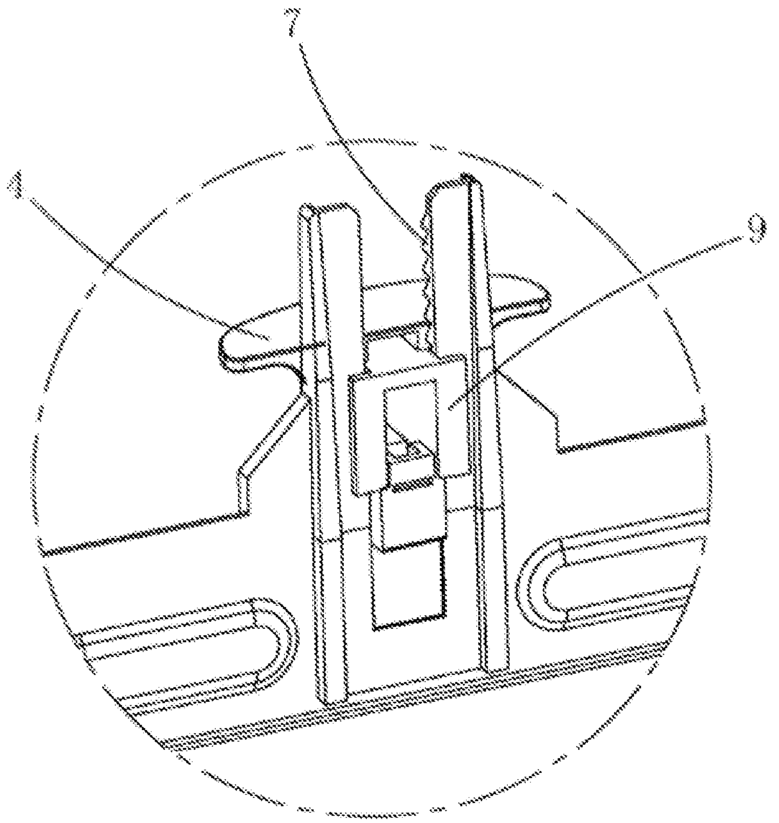
FIG. 5 illustrates a zoom-up view showing the connection of a gear track and a gear block.

FIG. 5 shows a gear track 7 to provide a movement of the gear block 4 that has a limiter 9.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a main housing with a fan bracket and a light bracket;

a light module disposed to the light bracket for emitting a light outwardly to an illuminated space;

a ventilating fan attached to the fan bracket, wherein the ventilating fan has an air passage exposed toward the illuminated area for air to flow passing the air passage driven by the ventilating fan; and a fixing frame for holding the main housing and for fixing to one of multiple types of installation platforms, wherein the main housing is detachable from the fixing frame, wherein the fixing frame has two telescopic levers arranged in parallel for changing a spanning diameter to fit different installation platforms, wherein the main housing is attached on the fixing frame, wherein the fixing frame has a pair of gear tracks and a pair of gear blocks, wherein a bottom of the gear block engages the installation platform, wherein the gear block is movable along the gear track to adjust a relative position of the fixing frame to the installation platform.

2. The lighting apparatus of claim 1, wherein the gear block has an elastic unit for elastically engaging the installation platform.

3. The lighting apparatus of claim 2, wherein the elastic unit is a U-shape clip with a bottom side pressing the installation platform.

4. The lighting apparatus of claim 2, wherein the elastic unit is made of metal material for transmitting heat of the main housing to the installation platform.

5. The lighting apparatus of claim 1, wherein multiple protruding clips extended from edges of the fixing frame to press to a bottom side of a plate of the installation platform while the bottom of the gear block engages a top side of the plate of the installation platform so as to firmly fix the fixing frame to the plate of the installation platform.

6. The lighting apparatus of claim 1, wherein the gear track comprises a fork structure defining a track passage for inserting the gear block, wherein the fork structure has multiple gear units for keeping the gear block unless an external force is applied to the gear block to move with respect to the gear track.

7. The lighting apparatus of claim 6, wherein when the gear block moves along the gear track, the fork structure has an elastic deformation when the external force is applied to the gear block.

8. The lighting apparatus of claim 1, wherein the fixing frame has two bars arranged in parallel for disposing the gear tracks, wherein the two bars and the telescopic levers form a rectangular structure.

9. The lighting apparatus of claim 1, wherein the gear track has a limiter for limiting a movement range of the gear block with respect to the gear track.

10. The lighting apparatus of claim 1, wherein the fixing frame has two grooves for inserting protruding tongues into the two grooves to attach the main housing to the fixing frame.

11. The lighting apparatus of claim 10, wherein the main housing is movable along the two groove.

12. The lighting apparatus of claim 1, wherein the installation platform comprises two beams and a top ceiling, wherein two ends of the fixing frame are respectively fixed to the two beams.

13. The lighting apparatus of claim 12, wherein the two telescopic levers are adjusted to change a spanning length to fit a distance between the two beams.

14. The lighting apparatus of claim 1, wherein a ceiling plate has an installation opening for fixing the fixing frame, wherein the ceiling plate is attached to the ceiling after the fixing frame and the main housing are fixed to the ceiling plate.

15. The lighting apparatus of claim 1, wherein a lateral side of the fixing frame has installation holes to be fixed to a lateral side of a beam, wherein the main housing is installed to the fixing frame after the fixing frame is fixed to the beam.

16. The lighting apparatus of claim 1, wherein an ultraviolet light source is placed in air tunnel for the air driven by the ventilating fan to sterilize the air.

17. The lighting apparatus of claim 1, wherein the ventilating fan has a humidity sensor and automatically turns on the ventilating fan when the humidity sensor detects a humidity larger than a predetermined threshold.

18. The lighting apparatus of claim 1, wherein the ventilating fan creates an air flow to perform heat dissipation of the light module.

19. The lighting apparatus of claim 1, wherein the light module emits a light signal when the ventilating fan functions abnormally.

* * * * *